US006995206B2

(12) United States Patent
Zhou et al.

(10) Patent No.: US 6,995,206 B2
(45) Date of Patent: Feb. 7, 2006

(54) METHODS OF PREPARING LATEX PARTICULATES WITH REACTIVE FUNCTIONAL GROUPS

(75) Inventors: Zhang-Lin Zhou, Mountain View, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 160 days.

(21) Appl. No.: 10/629,289

(22) Filed: Jul. 28, 2003

(65) Prior Publication Data

US 2005/0027065 A1    Feb. 3, 2005

(51) Int. Cl.
*C08L 77/00*    (2006.01)
(52) U.S. Cl. .................. 524/514; 524/700; 524/714; 524/716; 524/545; 524/550; 524/765; 524/767; 526/910; 526/911
(58) Field of Classification Search ................ 524/700, 524/714, 716, 514, 545, 550, 765, 767; 526/910, 526/911
See application file for complete search history.

(56) References Cited

U.S. PATENT DOCUMENTS

| | | | |
|---|---|---|---|
| 5,409,971 A | | 4/1995 | Wolfersberger et al. |
| 5,412,087 A | * | 5/1995 | McGall et al. ............. 536/24.3 |
| 5,489,678 A | * | 2/1996 | Fodor et al. ............... 536/22.1 |
| 2002/0058252 A1 | * | 5/2002 | Ananiev ...................... 435/6 |
| 2003/0144499 A1 | * | 7/2003 | McGall et al. ............. 536/25.3 |

FOREIGN PATENT DOCUMENTS

WO    WO 98/52980    11/1998

OTHER PUBLICATIONS

Ganachaud, F., F Sauzedde, A. Elaissari, and C. Pichot, "Emulsifier-Free Emulsion Copolymerization of Styrene with Two Different Amino-Containing Cationic Monomers. L Kinetic Studies," Journal of Applied Polymer Science, vol. 65, 2315-2330 (1997).

Cousin, P. and P. Smith, "Synthesis and Characterization of Styrene-Based Microbeads Possessing A mine Functionality," Journal of Applied Polymer Science, vol. 54, 1631-1641 (1994).

Basinska, T. and S. Slomkowski, "Attachment of horseradish peroxidase (HRP) onto thepoly(styrene/acrolein) latexes and onto their derivatives with amino groups on the surface; activity of immobilized enzyme," Colloid Polym Sci 273: 431-438 (1995).

Covolan, Vera L., Lucia H. Innocentini Mei and Claudio L. Rossi, "Chemical Modifications on Polystyrene Latex: Preparation and Characterization for Use in Immunological Applications," Polymers for Advanced Technologies vol. 8, pp. 44-50.

Quash, G., Anne-Marie Roch, A. Niveleau, J. Grange, T. Keolouangkhot and J. Huppert, "The Preparation of Latex Particles with Covalently Bound Polymines, IgG and Measles Agglutinins and Their Use in Visual Agglutination Tests," Journal of Immunological Methods, 22 (1978) 165-174.

Molday, Robert S., William J. Dreyer, Alan Rembaum, and S.P.S. Yen, "New Immunolatex Spheres: Visual Markers of Antegens on Lymphocytes for Scanning Electron Microscopy," The Journal of Cell Biology, vol. 64, 1975, pp. 75-88.

H.G. Fravel et al, "Perparation, Polymerization, and Evaluation of Blocked Isocyanatoethyl Methacrylate", Ind. Eng. Chem Prod. Res Dev, 1984, 23, pp 586-590.

P. Cousin et al, "Synthesis and Characterization of Styrene-Based Microbeads Possessing Amine Frunctionality", Jrnl of Applied Polymer Science, 54 (1994) Dec. 12, No. 11.

* cited by examiner

*Primary Examiner*—William K. Cheung

(57)    ABSTRACT

The present invention is drawn to a method of generating functionalized latex particulates in a colloidal suspension. The method can comprise steps of protecting functional groups present on polymerizable monomers with photo labile groups to form protected monomers; polymerizing the protected monomers to form a protected polymer; and exposing the protected polymer to a wavelength of light that removes the photo labile groups from the functional groups, thereby forming the functionalized latex particulates. These latex particulates can be used in a wide variety of applications, including in ink-jet ink printing applications.

15 Claims, No Drawings

METHODS OF PREPARING LATEX PARTICULATES WITH REACTIVE FUNCTIONAL GROUPS

FIELD OF THE INVENTION

The present invention relates generally to surface functionalized latex particulates and a method for the manufacture thereof.

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. A commonly used method for connecting biological molecules, dye molecules, or the like, to the surface of latex particles is by physical or passive adsorption. However, resulting colloid systems tend to be less stable. Such instability can be avoided by covalently bonding biomolecules, dye molecules, or the like, to latex particulates of an emulsion. While functionalized latex particulates have applications in these and other fields, the ink-jet ink imaging application can be used to favorably illustrate unique advantages of the invention. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

This being the case, there is a continuing need to provide improved methods of preparing latex particulates having functional groups on the surface, which can in turn be used for chemical reaction with target molecules. One example of such a functional group is an amino group, which is quite reactive. To prepare amino-functionalized latex polymer particles, there have been several methods proposed. One method has been by copolymerization of methacrylates containing hydroxyl and carbonyl groups, which are chemically modified to have an amino group on the surface. Other methods have included post-polymerization of copolymers of styrene and chloromethyl styrene, the modification of carbonyl surface groups, or the nitration of polystyrene and reduction to amino groups. All of these methods can result in colloid systems that lack stability due to changes in the medium conditions, resulting in part from chemical reaction that occurs to provide the amino functional group.

SUMMARY OF THE INVENTION

It has been recognized that it would be advantageous to develop manufacturing procedures for the preparation of surface functionalized latex particulates, which can be used for ink-jet ink and other applications. In furtherance of this recognition, a method of generating functionalized latex particulates in a colloidal suspension, can comprise steps of a) protecting functional groups present on polymerizable monomers with photo labile groups to form protected monomers; b) polymerizing the protected monomers to form a protected polymer; and c) exposing the protected polymer to a wavelength of light that removes the photo labile groups from the functional groups, thereby forming the functionalized latex particulates.

In another embodiment, a method of preparing an ink-jet ink can comprise the steps of preparing functionalized latex particulates in a colloidal suspension, as described previously, and then admixing the colloidal suspension with a liquid vehicle and a colorant, wherein an ink-jettable ink-jet ink is formed. Alternatively, if forming an ink-jettable overcoat compositions for protecting an ink-jet produced image, the colloidal suspension can be admixed with a liquid vehicle, without colorant.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

"Photo labile group" is any group that can be used to cap or protect a functional group, and which can be removed by exposure to light, preferably ultraviolet light.

"Ultraviolet light (UV)" is light having a wavelength of 40 to 400 nanometers (nm).

The term "functional group" or "functionalized" can refer to groups that are reactive, such as amino groups, thiol groups, or hydroxyl groups, and which do not substantially participate in the polymerization process. These groups can be present on polymerizable monomers as well as on latex particulates. Photo labile groups can be used to protect these functional groups present on monomers during polymerization, and after polymerization, the photo labile groups can be removed to functionalize the latex particulates in accordance with embodiments of the present invention.

The term "protected" refers to the state of a functional group that is capped or bonded to a photo labile group. A monomer can be protected in preparation for polymerization, and a polymer or latex particulate can be protected prior to decapping or deprotecting the particulates, such as upon exposure to light, preferably ultraviolet light.

As used herein, "liquid vehicle" or "ink vehicle" refers to the fluid in which colorants and latex particulates of the present invention can be dispersed (or solvated in the case of dyes) to form ink-jet inks in accordance with embodiments of the present invention. Many liquid vehicles and vehicle components are known in the art. Typical liquid vehicles can include a mixture of a variety of different agents, such as co-solvents, buffers, biocides, sequestering agents, viscosity modifiers, and water.

"Colorant" can include dyes, pigments, and/or other particulates that may be suspended or solvated in a liquid vehicle in accordance with embodiments of the present invention. Dyes are typically water soluble, and therefore, can be desirable for use in many embodiments. However, pigments can also be used. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer or an oligomer or a surfactant) in the liquid vehicle and/or in the pigment that utilizes a physical coating to aid the pigment in becoming and/or substantially remaining dispersed in a liquid vehicle.

With this in mind, it has been recognized that it would be advantageous to develop a practical method for the preparation of latex polymer particulates having reactive functional groups on the surface. The reactive functional groups can be used to attach dye molecules, biological molecules, or other useful molecules, to the latex particulate surface.

In one embodiment, a method of generating functionalized latex particulates in a colloidal suspension can comprise steps of a) protecting functional groups present on polymerizable monomers with photo labile groups to form protected monomers; b) polymerizing the protected monomers to form a protected polymer; and c) exposing the protected polymer to a wavelength of ultraviolet light that removes the photo labile groups from the functional groups, thereby forming the functionalized latex particulates. The functional group can be any functional group that can be reactive with a predetermined molecule, such as a biological or dye molecule. Exemplary functional groups include amino, thiol, and hydroxyl groups, to name a few.

To provide an example of an embodiment of the present invention, one can consider the preparation of amino functionalized latex particulates. In this embodiment, an amino-containing monomer can be protected with a photo labile protective group before emulsion polymerization. After polymerization, a certain wavelength of UV light can be exposed to the colloidal system. Upon UV exposure, the photo labile group can decompose into the solution, or otherwise be liberated into the emulsion, resulting in functional amino groups on the surface of the latex particulate. As this method does not add any chemicals to the emulsion system, the latex emulsion can typically remain stable.

Formula 1 below provides a schematic representation of an embodiment of the present invention.

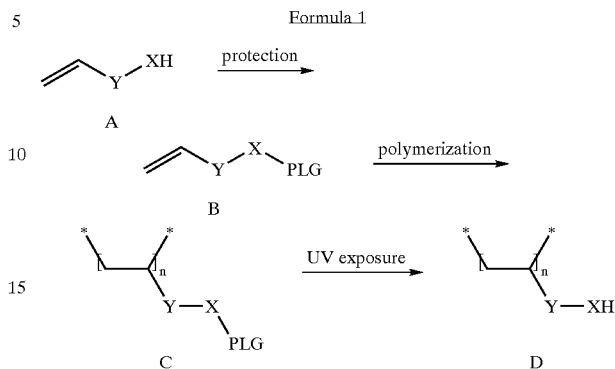

In Formula 1 above, Y can be a bridging group, which tethers the polymerizable double bond with a reactive functional group (XH). Y can be, for example, saturated or unsaturated lower alkylene, heteroatom-containing alkylene, substituted benzene, ester, ether, carbonyl, or the like. X can be NH, S, or O (resulting in $NH_2$, SH, or OH). The variable n can represent the number of monomer units of the polymer backbone, and can range from 2 to 50,000 in one embodiment. PLG represent any functional photo labile capping group. Examples include photosensitive azo, photosensitive ester or ether, photosensitive amide or imide, photosensitive amine or imine, photosensitive thio-ether or thio-ester, photosensitive isocyanamides, photosensitive hetero-ring system with at least one of hetero-atom, e.g., N, O, S, B, P, etc. Commonly-known photo labile groups and corresponding wavelengths that can be used to decompose or otherwise remove the photo labile group to liberate a functional reactive group are listed as follows: α-carboxy-2-nitrobenzyl (CNB, 260 nm), 1-(2-nitrophenyl)ethyl (NPE, 260 nm), 4,5-dimethoxy-2-nitrobenzyl (DMNB, 355 nm), 1-(4,5-dimethoxy-2-nitrophenyl)ethyl (DMNPE, 355 nm), (4,5-dimethoxy-2-nitrobenzoxy)carbonyl (NVOC, 355 nm), 5-carboxymethoxy-2-nitrobenzyl (CMNB, 320 nm), ((5-carboxymethoxy-2-nitrobenzyl)oxy)carbonyl (CMNCBZ, 320 nm), desoxybenzoinyl (desyl, 360 nm), anthraquino-2-ylmethoxycarbonyl (AQMOC, 350 nm).

Though several photo labile groups are listed above, others can be used as well. In accordance with Formula 1, considerations for selecting a photo labile group for use in combination with a polymerizable monomer are provided as follows:

(i) after the protection step, the resulting polymerizable monomer can be configured appropriately for forming a latex particulate;

(ii) after the polymerization step, the photo labile group can be configured to be easily removed, decomposed, or otherwise uncapped under certain light exposure;

(iii) after the polymerization step, the polymer backbone can be configured to be stable to the light exposure used to decompose or otherwise remove the photo labile group;

iv) after the light exposure step, the photo labile group (removed from the polymer) can be configured to be water-soluble or volatile, returning to the fluid of the emulsion or bubbling off as a gas, for example; and v) after the light exposure step, the decomposed photo labile group can be configured to not interfere with the latex particulate present in the emulsion.

More specific examples in accordance with that described in Formula 1 are illustrated as Formulas 2 and 3, as follows:

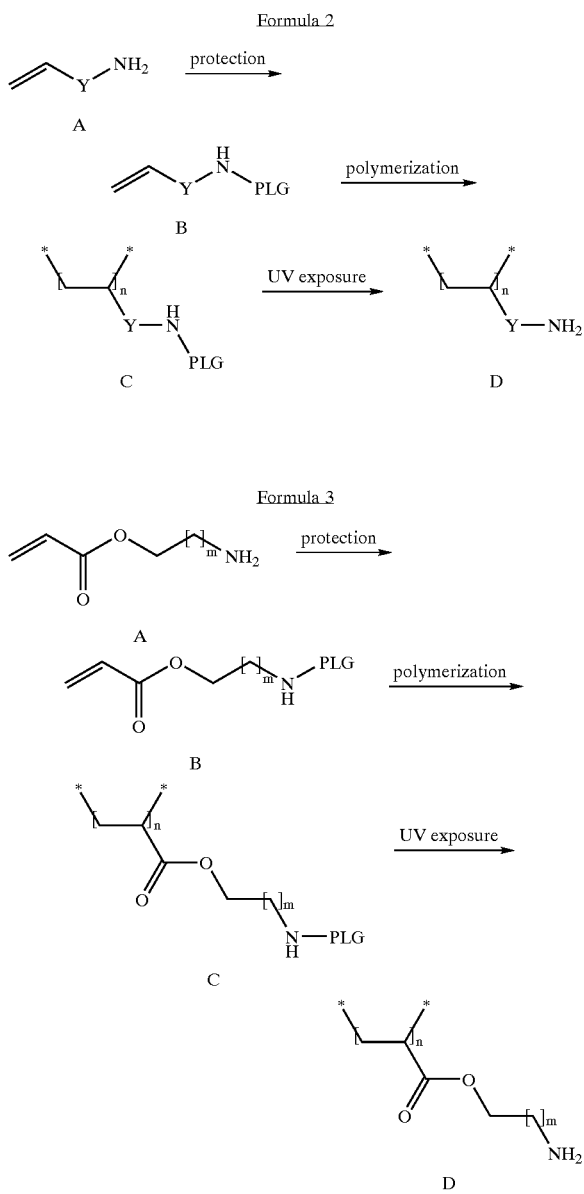

In the above Formulas 2 and 3, variables PLG and n can be the same as described with respect to Formula 1. In Formula 2, Y can also be the same as that described in Formula 1. In Formula 3, an ester group is shown as attaching the monomer to the functional group, and m can be from 0 to 30. Both Formulas 2 and 3 exemplify an amino functional group, though embodiments having thiol or hydroxyl functional groups can be used in accordance with embodiments of the present invention.

The preparation of latex particulates in accordance with embodiments of the present invention can result in a latex emulsion having latex particulates of a weight average molecular weight from 10,000 Mw to 5,000,000 Mw. Additionally, though Formulas 1 to 3 depict polymerization using a single monomer, copolymeric latex particulates can be formed as well. For example, block copolymers, randomly assembled copolymers, copolymers including crosslinkers, and the like can be formed. Additionally, monomers with functional groups can be copolymerized with other monomers with or without functional groups at various ratios to provide various results. If a crosslinking agent is used to crosslink a polymer, the application of use of the resultant latex particulate can be considered. For example, if the latex particulate is to be used in an ink-jet printing system, then from 0.1 wt % to 10 wt % of the crosslinking agent can be present with the photo labile group capped monomer, or photo labile group capped monomer-containing mix, and copolymerized therewith.

The latexes prepared in accordance with the present invention can be used in the ink-jet ink arts, such as with a colorant to form an ink, or without a colorant to form a protective coating for an ink-jet produced image. In the former embodiment, a method of preparing an inkjet ink can comprise steps of preparing functionalized latex particulates in a colloidal suspension as described previously. Upon preparing the colloidal suspension of functionalized latex particulates described herein, the colloidal suspension can then be admixed with a liquid vehicle and a colorant to form an ink-jettable ink-jet ink. Thus, in one embodiment, the liquid phase of the colloidal suspension and the liquid vehicle can become admixed to form a modified liquid vehicle containing the latex particulates and the colorant. If the colorant is a dye, then the dye is typically solvated in the liquid vehicle. In this embodiment, the total amount of solids in the ink-jet ink will be due to the presence of latex particulates prepared in accordance with embodiments of the present invention. However, if the colorant is a self-dispersed or polymer-dispersed pigment, the total solids content of the latex particulates and pigments should be considered when determining relative amounts that should be present for jettability purposes, as is known in the art. If utilizing a colorant to form an ink-jet ink, the method can further comprising the step of reacting the colorant with the functionalized latex particulates to form colorant-bound latex particulates.

Alternatively, If no colorant is used, but rather, the colloidal suspension is admixed with a liquid vehicle to form an ink-jettable colorless solution, then an ink-jettable protective coating material can be formed. In this embodiment, typically, an ink-jet ink can be jetted onto a substrate to produce an image, and the ink-jettable colorless solution can be overprinted with respect to the printed image for protection. The latex particulates can form a film over the printed image, and as the latex particulates are functionalized, the functional surfaces of the latex particulates can interact with the colorant or other component of the printed ink-jet ink to provide additional protection to the image.

A typical liquid vehicle formulation that can be used with the latexes described herein can include water, and optionally, one or more co-solvents present in total at from 0 wt % to 30 wt %, depending on the pen architecture. Further, one or more non-ionic, cationic, and/or anionic surfactants can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2- alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the liquid vehicle is not the same as the surfactant that is described as being adhered to the surface of the latex-encapsulated particulates, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Photo Labile Group-Protected Polymerizable Monomer

Ethanolamine was treated with di-t-butyl dicarbonate to obtain an amine protected ethanolamine. The alcohol group of the ethanolamine was reacted with methacryloyl chloride in the presence of triethylamine to obtain a methacryloyloxyethylamine protected by a tert-butyloxycarbonyl group (BOC). The amine was liberated by treating the BOC-protected methacryloyloxyethylamine with trifluoroacetic acid. The resulting amino derivative was treated with sodium hydride followed by 2-nitro-4,5-methoxybenzylbromide. This method resulted in the production of a polymerizable monomer having amine groups protected by photo labile groups that are sensitive to 350 nm light.

Example 2

Preparation of Photo Labile Group-Protected Latex Particulates

The photo labile group-protected polymerizable monomer (10 wt %) of Example 1 was mixed with methyl methacrylate (42 wt %), hexyl acrylate (42 wt %) and methacrylic acid (6 wt %) to form a monomer mixture. Though a cross-linker was not used in this example, it is to be noted that a cross-linker can be used, e.g., ethylene glycol dimethacrylate (0.5 to 10 wt %). The monomer mixture (about 35 wt %) was emulsified with Rhodafac RS 710 surfactant (2.5 wt % with respect to the monomers) and a balance of water. The monomer emulsion was added dropwise to hot water containing a potassium persulfate water soluble initiator (about 0.4 wt % with respect to the monomers). The heating was continued for a period of two hours and then cooled to ambient temperature. The latex was neutralized with potassium hydroxide solution to obtain the latex particulates having photo labile groups configured thereon. The particulates were present in an emulsion.

Example 3

Preparation of Amino Group-Functionalized Latex

The photo labile group-protected latex particulate-containing emulsion of Example 2 was exposed to 350 nm light for about 5 minutes. During the exposure, the linkage between the amine groups and the 2-nitro-4,5-methoxybenzyl group was cleaved to generate latex particulates having surface amino groups thereon.

Example 4

Ink-Jet Ink Preparation

The latex emulsion prepared in accordance with Example 3 (equivalent to 2.5 g solid polymer) was mixed with Sunsperse LFD 4343 colorant (5 g) along with a solvent vehicle (20 g). The solvent vehicle included 2-pyrrolidone and ethylene glycol. Water was then added to bring the concentration of the colorant to 3% by weight (collectively, the solvent vehicle and water form an exemplary liquid vehicle as described herein). An ink-jet ink composition was formed that includes latex particulates prepared in accordance with embodiments of the present invention.

Example 5

Overcoat Composition

The latex emulsion prepared in accordance with Example 3 (equivalent to 2.5 g solid polymer) was mixed with a solvent vehicle (20 g). The solvent vehicle included 2-pyrrolidone and ethylene glycol. Water was then added in a similar amount as described in Example 4. A coating composition was formed that includes latex particulates prepared in accordance with embodiments of the present invention.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A method of generating functionalized latex particulates in a colloidal suspension, comprising steps of:
   a) protecting functional groups present on polymerizable monomers with photo labile groups to form protected monomers;
   b) emulsion polymerizing the protected monomers to form a protected polymer; and
   c) exposing the protected polymer to a wavelength of light that removes the photo labile groups from the functional groups, thereby forming the functionalized latex particulates.

2. A method as in claim 1, wherein the functional groups are thiol.

3. A method as in claim 1, wherein the functional groups are amino.

4. A method as in claim 1, wherein the functional groups are hydroxyl.

5. A method as in claim 1, wherein the photo labile groups are selected from the group consisting of α-carboxy-2-nitrobenzyl (CNB), 1 -(2-nitrophenyl)ethyl (NPE), 4,5-dimethoxy-2-nitrobenzyl (DMNB), 1 -(4,5-dimethoxy-2-nitrophenyl)ethyl (DMNPE), (4,5-dimethoxy-2-nitrobenzoxy)carbonyl(NVOC), 5-carboxymethoxy-2-nitrobenzyl (CMNB), ((5-carboxymethoxy-2-nitrobenzyl)oxy)carbonyl (CMNCBZ), desoxybenzoinyl (desyl), and anthraquino-2-ylmethoxycarbonyl (AQMOC).

6. A method as in claim 1, wherein the functional groups are attached to the polymerizable monomers through a tethering group selected from the group consisting of saturated or unsaturated lower alkylene, heteroatom-containing alkylene, substituted benzene, ester, ether, carbonyl, and combinations thereof.

7. A method as in claim 1, wherein the functionalized latex particulates have a weight average molecular weight from 10,000 Mw to 5,000,000 Mw.

8. A method as in claim 1, wherein the functionalized latex particulates formed are not substantially sensitive to the wavelength of ultraviolet light.

9. A method as in claim 1, wherein upon the exposing step, the photo labile groups decompose into solution, and wherein the decomposed photo labile groups are not interactive with the functionalized latex particulates.

10. A method as in claim 1, wherein the photo labile groups are sensitive to a specific wavelength of light, resulting in the removal of the photo labile group from the protected polymer.

11. A method as in claim 10, wherein the specific wavelength of light is within the ultraviolet range of 40 to 400 nm.

12. A method as in claim 1, wherein the polymerizing step includes copolymerizing the protected monomers with at least one additional monomer, thereby forming copolymeric functionalized latex particulates.

13. A method as in claim 12, wherein the at least one additional monomer does not contain functional groups.

14. A method as in claim 12, wherein the at least one additional monomer contains a functional group.

15. A method as in claim 1, wherein the polymerizing step includes polymerizing the protected monomers in the presence of a crosslinking agent.

* * * * *